US008786602B2

(12) United States Patent
Koehler et al.

(10) Patent No.: US 8,786,602 B2
(45) Date of Patent: Jul. 22, 2014

(54) SYSTEM AND METHOD FOR HIERARCHICALLY DECOMPOSING PROCESS MODEL

(75) Inventors: Jana Koehler, Oberrieden (CH); Simon Danie Moser, Tuebingen (DE); Jussi H. Vanhatalo, Zurich (CH); Hagen Voelzer, Zurich (CH)

(73) Assignee: International Business Machines Corporation, Armonk, NY (US)

(*) Notice: Subject to any disclaimer, the term of this patent is extended or adjusted under 35 U.S.C. 154(b) by 1442 days.

(21) Appl. No.: 12/241,195

(22) Filed: Sep. 30, 2008

(65) Prior Publication Data

US 2010/0079458 A1 Apr. 1, 2010

(51) Int. Cl.
*G06T 11/20* (2006.01)
*G09G 5/00* (2006.01)
*G06T 11/40* (2006.01)

(52) U.S. Cl.
CPC ............ *G06T 11/206* (2013.01); *G06T 11/203* (2013.01); *G06T 11/40* (2013.01)
USPC ..................... 345/440; 345/440.1; 345/440.2; 345/441; 345/442; 345/629

(58) Field of Classification Search
CPC ...... G06T 11/206; G06T 11/203; G06T 11/40
USPC ............ 345/440, 440.1, 440.2, 441, 442, 629
See application file for complete search history.

(56) References Cited

U.S. PATENT DOCUMENTS 7,222,302 B2 5/2007 Hauser et al.

OTHER PUBLICATIONS

J. Vanhatalo, H. Völzer, J. Koehler, "The Refined Process Structure Tree", Proceedings of the 6th International Conference on Business Process Management (BPM), Milan, Italy, Sep. 2-4 2008, pp. 100-115 (2008).*
Jacobo Valdes Ayesta. Parsing flowcharts and series-parallel graphs. PhD thesis, Stanford University, CA, USA, 240 pages, Aug. 1978.
Carsten Gutwenger and Petra Mutzel. A linear time implementation of SPQR-trees. Joe Marks, editor, Graph Drawing, vol. 1984 of LNCS, pp. 77-90. Springer, 2000.
J. E. Hoperoft and R. E. Tarjan. Dividing a graph into triconnected components. SIAM J. Comput., vol. 2, No. 3, pp. 135-158, Sep. 1973.
Richard Johnson, David Pearson, and Keshav Pingali. The program structure tree: Computing control regions in linear time. In Proceedings of the ACM SIGPLAN'94 Conference on Programming Language Design and Implementation (PLDI), pp. 171-185, Jun. 1994.

(Continued)

*Primary Examiner* — Jin-Cheng Wang
(74) *Attorney, Agent, or Firm* — Schmeiser, Olsen & Watts, LLP; Jeanine S. Ray-Yarletts

(57) ABSTRACT

A system and associated method for hierarchically decomposing a workflow graph G into a process structure tree PST. The workflow graph G is a two-terminal graph parsed into a tree T having triconnected components. Boundary pairs of all triconnected components in T are computed and fragments are discovered with boundary pairs. T is restructured into PST pursuant to categories of triconnected components in T. PST is deterministic and modular. PST represents a block-based process model that has fine blocks of execution units. PST is computed in time linear to the number of edges in G.

19 Claims, 17 Drawing Sheets

METHOD FOR HIERARCHICAL DECOMPOSITION OF A GRAPH-BASED
PROCESS MODEL INTO A BLOCK-BASED PROCESS MODEL

(56) References Cited

OTHER PUBLICATIONS

Richard Craig Johnson. Efficient program analysis using dependence flow graphs. PhD thesis, Cornell University, Ithaca, NY, USA, 190 pages, Aug. 1994.

Jochen Kuster, Christian Gerth, Alexander Forster, and Gregor Engels. Detecting and resolving process model differences in the absence of a change log. BPM 2008, LNCS 5240, pp. 244-260, Springer, 2008.

Kristian Bisgaard Lassen and Wil M. P. van der Aalst. WorkflowNet2BPEL4WS: A tool for translating unstructured workflow processes to readable BPEL. OTM Conferences (1), vol. 4275 of LNCS, pp. 127-144. Springer, 2006.

Niels Lohmann and Jens Kleine. Fully-automatic translation of open workflow net models into human-readable abstract BPEL processes. IModellierung 2008, vol. P-127 of Lecture Notes in Informatics (LNI), pp. 57-72. GI, Mar. 2008.

Chun Ouyang, Marlon Dumas, Arthur H. M. ter Hofstede, and Wil M. P. van der Aalst. From BPMN process models to BPEL web services. ICWS, pp. 285-292. IEEE Computer Society, 2006.

Chun Ouyang, Marlon Dumas, Stephan Breutel, and Arthur H. M. ter Hofstede. Translating standard process models to BPEL. Technical Report BPM-05-27, BPMcenter.org, 17 pages, Nov. 2005.

Chun Ouyang, Wil M. P. van der Aalst, Marlon Dumas, and Arthur H. M. ter Hofstede. Translating BPMN to BPEL. [online]. 22 pages. [retrieved on Sep. 29, 2008]. Retrieved from the Internet< URL: http://eprints.qut.edu.au/archive/00003615/01/3615.pdf>, Sep. 29, 2008.

Wasim Sadiq and Maria E. Orlowska. Analyzing process models using graph reduction techniques. Inf. Syst., 25(2):117-134, 2000.

Robert E. Tarjan and Jacobo Valdes. Prime subprogram parsing of a program. In POPL '80: Proceedings of the 7th ACM SIGPLAN-SIGACT Symposium on Principles of Programming Languages, pp. 95-105, New York, NY, USA, 1980. ACM.

Jussi Vanhatalo, Hagen Voelzer, and Frank Leymann. Faster and more focused control-flow analysis for business process models though SESE decomposition. ICSOC 2007, vol. 4749 of LNCS, pp. 43-55. Springer, 2007.

* cited by examiner

METHOD FOR HIERARCHICAL DECOMPOSITION OF A GRAPH-BASED
PROCESS MODEL INTO A BLOCK-BASED PROCESS MODEL

EXAMPLE DATA ATTRIBUTES FOR COMPONENT FOR HIERARCHICAL
DECOMPOSITION METHOD OF FIG. 2

```
A01:   component c
       {
A02:   parent : Component
A03:   children : List of Components
A04:   edges : List of Edges
A05:   type : {bond, polygon, triconnected, trivial, non-tcc}
A06:   isFragment : boolean
A07:   isMerged : boolean
A08:   entry : Node
A09:   exit : Node
A10:   b0 : Node
A11:   b1 : Node
A12:   b0Incoming : int
A13:   b0Outgoing : int
A14:   b1Incoming : int
A15:   b1Outgoing : int
A16:   entriesOfChildren : int
A17:   exitsOfChildren : int
A18:   firstEntryOfChild : Node
A19:   lastEntryOfChild : Node
A20:   latestChildWithEntry : Component
A21:   descendantsToMerge : LinkedList of Components
A22:   siblingsToMerge : List of Components
A23:   maxSubSequence : Component
       }
```

FIG. 3

EXAMPLE PROCEDURE RESTRUCTURING TRICONNECTED
COMPONENT FOR STEP 230 OF FIG. 2

```
301:    restructure(component c)
        {
302:    if (c.type == polygon and ¬isFragment and
303:        c.entriesOfChildren + c.exitsOfChildren > 4)
304:    then
305:        c.maxSubSequence ⇐ new component 306:    for each component d in c.children do
307:        restructure(d)

308:    if c.type == polygon then
309:        restructurePolygon(c)    // FIG. 3B
310:    else if c.type == bond then
311:        restructureBond(c)       // FIGS. 3C-1, 3C-2

312:    collectDescendantFragmentWoParent(c)

313:    if c.parent ≠ null and c.parent.type == polygon then
314:        analyzeChildOfPolygon(c, c.parent)
        }
```

FIG. 3A

EXAMPLE PROCEDURE RESTRUCTURING POLYGON AT LINE 309 OF
FIG. 3A

```
restructurePolygon(component c)
    childComponents ⇐ c.children
    c.children ⇐ new list
    if c.isFragment then
        // Process each child d of c that is not merged.
        for each component d in c.childComponents do
            if ¬d.isMerged then
                // Merge siblings to form a fragment.
                for each component s in d.siblingsToMerge do
                    addChildrenOf(s,d)
                    d.exit ⇐ s.exit
                // If the unmerged d was not a fragment, but the merged d.
                if ¬d.isFragment and d.entry ≠ null and d.exit ≠ null then
                    d.isFragment ⇐ true
                // Collect descendant fragments of d from its siblings.
                d.children.addAll(d.descendantsToMerge)
                d.descendantsToMerge ⇐ new list
                d.descendantsToMerge.add(d)
                // Associate d with its parent fragment c.
                addChild(d, c)
    else // c is not a fragment
        boolean addMaxSubSequence ⇐ false
        if c.maxSubSequence ≠ null then
            addMaxSubSequence ⇐ true
        // Process each child d of c that is not merged.
        for each component d in c.childComponents do
            if ¬d.isMerged then
                // Merge siblings to form a fragment.
                for each component s in d.siblingsToMerge do
                    addChildrenOf(s,d)
                    d.exit ⇐ s.exit
                // If the unmerged d was not a fragment, but the merged d.
                if ¬d.isFragment and d.entry ≠ null and d.exit ≠ null then
                    d.isFragment ⇐ true
                    d.children.addAll(d.descendantsToMerge)
                    d.descendantsToMerge ⇐ new list
                    d.descendantsToMerge.add(d)
                // Associate d with its parent fragment c or maxSequence.
                if d.isFragment and c.maxSequence ≠ null then
                    // If maxSequence is not added yet to c, add it.
                    if addMaxSubSequence then
                        addMaxSubSequence ⇐ false
                        addChild(c.maxSequence, c)
                        c.maxSequence.isFragment ⇐ true
                    addChild(d, c.maxSequence)
                else
                    addChild(d, c)
```

FIG. 3B

EXAMPLE PROCEDURE RESTRUCTURING BOND AT LINE 311 OF FIG. 3A

```
restructureBond(component c)
    purebOb1 ⇐ new component; pureb1b0 ⇐ new component
    semiPure ⇐ new component; undirected ⇐ new component
    semiPureb0Ub1 ⇐ new component; semiPureb1Ub0 ⇐ new component
    semiPureUb0Ob1 ⇐ new component; semiPureUb1b0 ⇐ new component
    // Step 1. Categorize branches of the bond based on their direction.
    childComponents ⇐ c.children; c.children ⇐ new list
    for each component d in childComponents do
        if d.b0 = c.b0 then
            if d.b0Incoming = 0 then // d.b0 has only outgoing edges in d
                if d.b1Outgoing = 0 then // d.b1 has only incoming edges in d
                    addChild(d, purebOb1)
                else
                    addChild(d, semiPureb0Ub1)
            else if d.b0Outgoing = 0 then // d.b0 has only incoming edges in d
                if d.b1Incoming = 0 then // d.b1 has only outgoing edges in d
                    addChild(d, pureb1b0)
                else
                    addChild(d, semiPureUb1Ub0)
            else if d.b1Outgoing = 0 then // d.b1 has only incoming edges in d
                addChild(d, semiPureUb0b1)
            else if d.b1Incoming = 0 then // d.b1 has only outgoing edges in d
                addChild(d, semiPureb1Ub0)
            else
                addChild(d, undirected)
        else
            if d.b1Incoming = 0 then // d.b0 (c.b1) has only outgoing edges in d
                if d.b0Outgoing = 0 then // d.b1 has only incoming edges in d
                    addChild(d, purebOb1)
                else
                    addChild(d, semiPureb0Ub1)
            else if d.b1Outgoing = 0 then // d.b0 has only incoming edges in d
                if d.b0Incoming = 0 then // d.b1 has only outgoing edges in d
                    addChild(d, pureb1b0)
                else
                    addChild(d, semiPureUb1Ub0)
            else if d.b0Outgoing = 0 then // d.b1 has only incoming edges in d
                addChild(d, semiPureUb0b1)
            else if d.b0Incoming = 0 then // d.b1 has only outgoing edges in d
                addChild(d, semiPureb1Ub0)
            else
                addChild(d, undirected)
```

FIG. 3C-1

EXAMPLE PROCEDURE RESTRUCTURING BOND AT LINE 311 OF FIG. 3A (CONTINUED)

```
// Step 2. Find the semi-pure bond fragment if one exists
if undirected.children.size = 0
and semiPureb0Ub1.children.size = 0 and semiPureb1Ub0.children.size = 0
and (semiPureUb0b1.children.size > 0 or semiPureUb1b0.children.size > 0) then
    if c.entry = c.b0 and c.exit = c.b1 then
        semiPure ⇐ semiPureUb0b1
        undirected ⇐ semiPureUb1b0
    else
        semiPure ⇐ semiPureUb1b0
        undirected ⇐ semiPureUb0b1
else if undirected.children.size = 0
and (semiPureb0Ub1.children.size > 0 or semiPureb1Ub0.children.size > 0)
and semiPureUb0b1.children.size = 0 and semiPureUb1b0.children.size = 0 then
    if c.entry = c.b0 and c.exit = c.b1 then
        semiPure ⇐ semiPureb0Ub1
        undirected ⇐ semiPureb1Ub0
    else
        semiPure ⇐ semiPureb1Ub0
        undirected ⇐ semiPureb0Ub1
else
    addChildrenOf(semiPureb0Ub1, undirected)
    addChildrenOf(semiPureb1Ub0, undirected)
    addChildrenOf(semiPureUb0b1, undirected)
    addChildrenOf(semiPureUb1b0, undirected)
// Step 3. Create the substructure of the bond c.
if c.isFragment then
    if c.entry = c.b0 or c.exit = c.b1 then
        restructureBondFragment(c, pureb0b1, pureb1b0, semiPure, undirected)
    else
        restructureBondFragment(c, pureb1b0, pureb0b1, semiPure, undirected)
else // The bond c is not a fragment.
    if c.entry = c.b0 or c.exit = c.b1 then
        restructureBondNonFragment(c, pureb0b1, pureb1b0, semiPure, undirected)
    else
        restructureBondNonFragment(c, pureb1b0, pureb0b1, semiPure, undirected)
```

FIG. 3C-2

EXAMPLE SUB-PROCEDURE RESTRUCTURING FRAGMENT BOND
INVOKED BY PROCEDURE RESTRUCTURING BOND OF FIGS. 3C-1 AND
3C-2 restructureBondFragment(component c, component pure, component reversePure, component semiPure, component undirected)
  // Step 1. The reverse pure branches become children of the bond fragment c.
  addChildrenOf(reversePure, c)
  // Step 2. The pure bond fragment becomes a child of either (1) the semi-pure bond, (2) the undirected bond, or (3) the bond fragment if they exist.
  if $pure.children.size > 1$ then
    if $semiPure.children.size > 0$ then
      addChildFragmentAndCollectItsDescendants(pure, semiPure)
    else if $undirected.children.size > 0$ then
      addChildFragmentAndCollectItsDescendants(pure, undirected)
    else if $c.children.size > 0$ then
      addChildFragmentAndCollectItsDescendants(pure, c)
    else
      addChildrenOf(pure, c)
  else if $pure.children.size = 1$ then
    if $semiPure.children.size > 0$ then
      addChildrenOf(pure, semiPure)
    else if $undirected.children.size > 0$ then
      addChildrenOf(pure, undirected)
    else
      addChildrenOf(pure, c)
  // Step 3. The semi-pure bond fragment becomes a child of either (1) the undirected bond, or (2) the bond fragment if they exist.
  if $semiPure.children.size > 1$ then
    addChildFragmentAndCollectItsDescendants(semiPure, undirected)
  else if $semiPure.children.size = 1$ then
    addChildrenOf(semiPure, undirected)
  // Step 4. The undirected bond fragment becomes a child of the bond fragment if they exist.
  if $undirected.children.size > 1$ and $c.children.size > 0$ then
    addChildFragmentAndCollectItsDescendants(undirected, c)
  else
    addChildrenOf(undirected, c)

FIG. 3D

EXAMPLE SUB-PROCEDURE RESTRUCTURING NONFRAGMENT BOND
INVOKED BY PROCEDURE RESTRUCTURING BOND OF FIGS. 3C-1 AND
3C-2

```
restructureBondNonFragment(component c, component pure, component reversePure,
component semiPure, component undirected)
    // Step 1. The pure bond fragment becomes a child of the semi-pure bond if they exist.
    if pure.children.size > 1 then
        if semiPure.children.size > 0 then
            addChildFragmentAndCollectItsDescendants(pure, semiPure)
        else // Otherwise, it becomes a child of the bond.
            addChildFragmentAndCollectItsDescendants(pure, c)
    else if pure.children.size = 1 then
        // A directed branch becomes a child of the semi-pure bond fragment if they exist.
        if semiPure.children.size > 0 then
            addChildrenOf(pure, semiPure)
        else // Otherwise, it becomes a child of the bond.
            addChildrenOf(pure, c)
    // Step 2. The reverse pure bond fragment becomes a child of the bond.
    if reversePure.children.size > 1 then
        addChildFragmentAndCollectItsDescendants(reversePure, c)
    else // A reverse directed branch becomes a child of the bond.
        addChildrenOf(reversePure, c)
    // Step 3. The semi-pure bond fragment becomes a child of the bond.
    if semiPure.children.size > 1 then
        addChildFragmentAndCollectItsDescendants(semiPure, c)
    else if semiPure.children.size = 1 then
        addChildrenOf(semiPure, c)
    // Step 4. The descendant fragments of undirected branches become children of the bond.
    if undirected.children.size > 0 then
        // Note that in this case the undirected branches do not form a fragment.
        addChild(undirected, c)
        undirected.isFragment = false
        collectDescendantFragmentsWoParent(undirected)
```

FIG. 3E

EXAMPLE TWO-TERMINAL GRAPH (TTG) INPUT TO STEP 210 OF FIG. 2

TRICONNECTED COMPONENTS IN TTG OF FIG. 4A

EXAMPLE TREE OF TRICONNECTED COMPONENTS (TCC TREE)
RESULTING FROM STEP 210 OF FIG. 2 ON INPUT TTG OF FIG. 4A

EXAMPLE COMPONENT SUBGRAPHS RESULTING FROM STEP 220 OF
FIG. 2 ON TTG OF FIG. 4A

EXAMPLE CANONICAL FRAGMENTS RESULTING FROM STEP 230 OF
FIG. 2 ON COMPONENT SUBGRAPHS OF FIG. 4D

EXAMPLE PROCESS STRUCTURE TREE (PST) REPRESENTING
CANONICAL FRAGMENTS OF FIG. 4E

US 8,786,602 B2

SYSTEM AND METHOD FOR HIERARCHICALLY DECOMPOSING PROCESS MODEL

FIELD OF THE INVENTION

The present invention discloses a system and associated method for transforming a graph process model into a block process model.

BACKGROUND OF THE INVENTION

A business process that is modelled in a graph-based language should be transformed into an equivalent block-based language to execute the business process in a computer system. However, conventional transformation of a business process from a graph-based model to a block-based model is neither modular nor deterministic. Also, the conventional transformation produces blocks that can be further divided into finer blocks, while fine-grained blocks are desirable in implementing the business process model.

Thus, there is a need for a system and associated method that overcomes at least one of the preceding disadvantages of current methods and systems of transforming a business process model from a graph-based model to a block-based model.

SUMMARY OF THE INVENTION

The present invention provides a method for hierarchically decomposing a two-terminal graph G into a process structure tree PST, the method comprising:

parsing G into a tree T comprising triconnected components;

finding all existing fragments from the triconnected components in T;

restructuring T such that PST consists of restructured T, and transmitting PST to an output device of a computer system, wherein G is defined as a two-terminal graph that is a directed graph without self-loops such that there is at most one source node s of G, and at most one sink node t of G, wherein t≠s and each node of G is on a directed path from s to t, wherein a triconnected component of said triconnected components is a bond, a polygon, or a 3-connected graph, and each triconnected component determines a respective boundary pair comprising two boundary nodes, wherein the respective boundary pair determines a respective fragment F of G, wherein F is a connected subgraph of G that has said two boundary nodes as an entry of F and an exit of F, wherein PST is a tree of canonical fragments of G such that a parent P of a canonical fragment of said canonical fragments is the smallest canonical fragment of G that properly contains the canonical fragment, and wherein the canonical fragment is a fragment of a program that does not overlap with any other fragment of the program, and wherein the program is executable by a microprocessor.

The present invention provides an apparatus comprising a computer program product, said computer program product comprising a computer readable storage medium having a computer readable program code embodied therein, said computer readable program code containing instructions configured to be executed by a processor of a computer system to implement a method for hierarchically decomposing a two-terminal graph G into a process structure tree PST, the method comprising:

parsing G into a tree T comprising triconnected components;

finding all existing fragments from the triconnected components in T;

restructuring T such that PST consists of restructured T, and transmitting PST to an output device of a computer system, wherein G is defined as a two-terminal graph that is a directed graph without self-loops such that there is at most one source node s of G, and at most one sink node t of G, wherein t≠s and each node of G is on a directed path from s to t, wherein a triconnected component of said triconnected components is a bond, a polygon, or a 3-connected graph, and each triconnected component determines a respective boundary pair comprising two boundary nodes, wherein the respective boundary pair determines a respective fragment F of G, wherein F is a connected subgraph of G that has said two boundary nodes as an entry of F and an exit of F, wherein PST is a tree of canonical fragments of G such that a parent P of a canonical fragment of said canonical fragments is the smallest canonical fragment of G that properly contains the canonical fragment, and wherein the canonical fragment is a fragment of a program that does not overlap with any other fragment of the program, and wherein the program is executable by a microprocessor.

The present invention provides a method and system that overcomes at least one of the current disadvantages of conventional method and system for parsing a two-terminal graph into a tree of canonical fragments.

BRIEF DESCRIPTION OF THE DRAWINGS

FIG. 3 illustrates an embodiment of component data structure employed in example procedures of FIGS. 3A, 3B, 3C-1, 3C-2, 3D, and 3E, in accordance with the embodiments of the present invention.

FIG. 3A illustrates an embodiment of a procedure restructure( ) restructuring a subgraph component into a process structure tree (PST) in step 230 of FIG. 2, in accordance with the embodiments of the present invention.

FIG. 3B illustrates an embodiment of a procedure restructurePolygon( ) restructuring a polygon that is invoked at line 309 of restructure( ) of FIG. 3A, in accordance with the embodiments of the present invention.

FIGS. 3C-1 and 3C-2 illustrate an embodiment of a procedure restructureBond( ) restructuring a bond that is invoked at line 311 of restructure( ) of FIG. 3A, in accordance with the embodiments of the present invention.

FIG. 3D illustrates an embodiment of a procedure restructureBondFragment( ) restructuring a fragment bond that is invoked from restructureBond( ) of FIGS. 3C-1 and 3C-2, in accordance with the embodiments of the present invention.

FIG. 3E illustrates an embodiment of a procedure restructureBondNonFragment( ) restructuring a non-fragment bond that is invoked from restructureBond( ) of FIGS. 3C-1 and 3C-2, in accordance with the embodiments of the present invention.

DETAILED DESCRIPTION OF THE INVENTION

Figure 1:
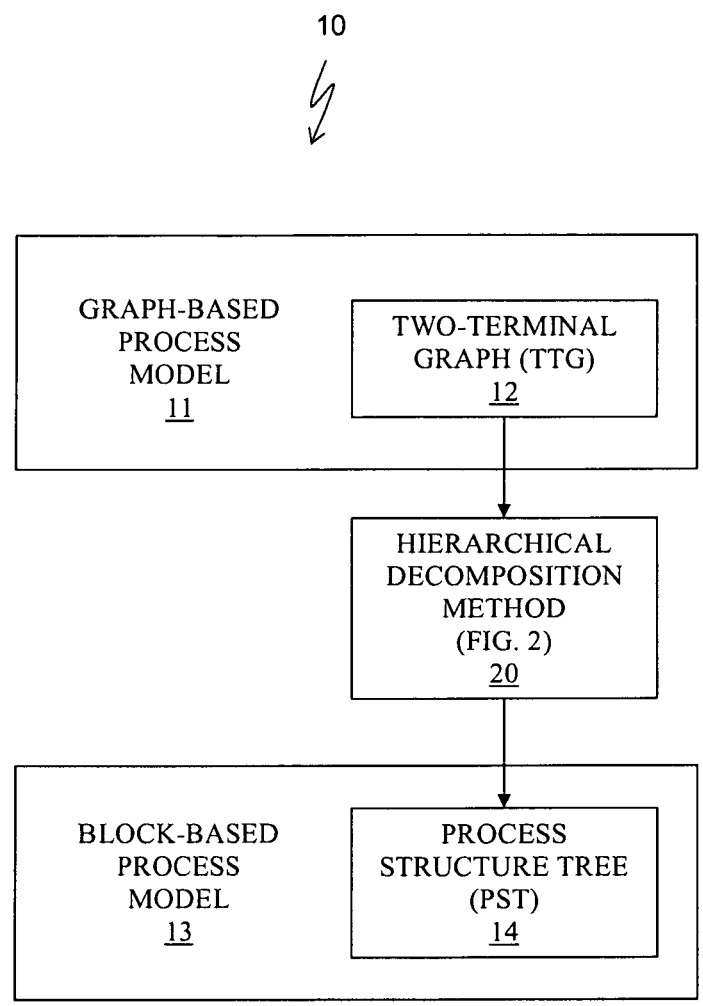
FIG. 1 illustrates a system for hierarchically decomposing a process model, in accordance with embodiments of the present invention.

FIG. 1 illustrates a system 10 for hierarchically decomposing a process model, in accordance with embodiments of the present invention.

The system 10 comprises a graph-based process model 11, a hierarchical decomposition method 20, and a block-based process model 13.

The graph-based process model 11 is represented as a two-terminal graph (TTG) 12 for the hierarchical decomposition method 20. The graph-based process model 11 describes a control flow of business processes with workflow graphs. Workflow graphs are expressed in business process languages. Examples of business process languages may be, inter alia, the Business Process Modeling Notation (BPMN) by the Object Management Group (OMG®), the Unified Modeling Language Activity Diagrams (UML AD), the Event-driven Process Chain diagrams (EPC), etc.

The two-terminal graph (TTG) 12 is a workflow graph that has two terminals, a source and a sink Because of the source and the sink, the two-terminal graph (TTG) 12 can also be referred to as a single-entry-single-exit workflow graph (SESE WFG), where the source represents an entry and the sink represents an exit. The two-terminal graph (TTG) 12 is defined as a directed graph without self-loops such that there is a unique source node s, the entry, and a unique sink node t, the exit, that is not identical to s (t≠s) and each node of the two-terminal graph (TTG) 12 is on a directed path from s to t.

The two-terminal graph (TTG) 12 is parsed into a hierarchy of blocks that represent sub-workflows that have an entry and an exit by the hierarchical decomposition method 20.

The block-based process model 13 is represented as a process structure tree (PST) 14, after the two-terminal graph 12 is decomposed by the hierarchical decomposition method 20. The block-based process model 13 describes a business flow in terms of blocks of the business flow. A block is an execution unit represented as a syntactical category of a programming language such as sequence, pick, if, repeat-until, flow etc. The block in the graph-based process model 11 is represented as a connected subgraph with unique entry and exit nodes comprising the two-terminal graph (TTG) 12. An example of the block-based process model 13 may be, inter alia, the Business Process Execution Language (BPEL) by OASIS®. A business process modeled in the block-based process model 13 can be easily executed on a computer platform.

The hierarchical decomposition method 20 takes the two-terminal graph (TTG) 12 of the graph-based process model 11 as an input and generates a process structure tree (PST) 14 of the block-based process model 13 as a result. See FIGS. 2, and 2A, infra, for details of the hierarchical decomposition method 20. The resulting process structure tree (PST) 14 is a control flow executing subprograms that are represented by corresponding blocks.

The process structure tree (PST) 14 is defined as a tree of canonical fragments of a two-terminal graph (TTG) G such that the parent of a canonical fragment F is the smallest canonical fragment of G that properly contains the canonical fragment F.

A fragment F is defined as a connected subgraph of a two-terminal graph (TTG) wherein F has exactly two boundary nodes, an entry and an exit. A boundary node v is an entry of F if no incoming edge of v is in F or all outgoing edges of v are in F. A boundary node v is an exit of F if all incoming edges of v are in F, or no outgoing edge of v is in F.

A canonical fragment F is defined as below, wherein $\mathcal{F}(u, v)$ denote the set of all fragments with entry u and exit v:

If $F_0 \in \mathcal{F}(v_0, v_1)$ and $F_1 \in \mathcal{F}(v_1, v_2)$ such that $F_0 \cup = F \in \mathcal{F}(v_0, v_2)$, then it is referred that $F_0$ and $F_1$ are in sequence (likewise: $F_1$ and $F_0$ are in sequence) and that F is a sequence. F is a maximal sequence if there is no fragment $F_2$ such that F and $F_2$ are in sequence.

A bond fragment (directed bond fragment etc.) $F \in \mathcal{F}(u, v)$ is maximal if there is no bond fragment (directed bond fragment etc.) $F' \in \mathcal{F}(u, v)$ that properly contains F. A bond fragment $F \in \mathcal{F}(u, v)$ is canonical if it is a maximal bond fragment, a maximal directed, maximal semi-pure, or maximal pure bond fragment such that F is not properly contained in any bond fragment $F' \in \mathcal{F}(v, u)$.

A fragment is canonical if it is a maximal sequence, a canonical bond fragment, or neither a sequence nor a bond fragment.

A bond fragment is defined as below:

Let S be a proper separation class (i.e., a branch) with respect to {u, v}. S is directed from u to v if it contains neither an incoming edge of u nor an outgoing edge of v. $\mathcal{B}(u, v)$ denotes the set of directed branches from u to v. S is undirected if it is neither in $\mathcal{B}(u, v)$ nor in $\mathcal{B}(v, u)$. The set of undirected branches between u and v is denoted by $\mathcal{U}(u, v)$.

A fragment $X \in \mathcal{F}(u, v)$ is a bond fragment if it is the union of at least two branches from $\mathcal{B}(u, v) \cup \mathcal{U}(u, v) \cup \mathcal{B}(v, u)$.

A fragment $X \in \mathcal{F}(u, v)$ is a directed bond fragment if it is the union of at least two branches from $\mathcal{B}(u, v) \cup \mathcal{U}(u, v)$.

A fragment $X \in \mathcal{F}(u, v)$ is a semi-pure bond fragment if it is the union of at least two branches from $\mathcal{B}(u, v) \cup \mathcal{U}(u, v)$, and if there exists no Y∈𝒰(u, v) such that Y⊆X, Y has an edge incoming to u, or if there exists no Y∈𝒰(u, v) such that Y⊆X, Y has an edge outgoing from v.

A fragment X∈ℱ(u, v) is a pure bond fragment if it is the union of at least two branches from 𝒜(u, v).

From implementation point of view, a canonical fragment in the process structure tree (PST) represents a proper subprogram within a parsed block-based process model.

Canonical fragments generated in the present invention are unique. Also, no two canonical fragments overlap, i.e., two canonical fragments are either nested or disjoint.

By definition, the largest fragment that contains a two-terminal graph (TTG) G, i.e. whole workflow graph, is the root fragment of the process structure tree (PST).

Canonical fragments are modular, in the sense that a local change to the two-terminal graph (TTG) G and consequent change of a canonical fragment only affects the process structure tree (PST) locally. It is because the parent and the siblings of a changed canonical fragment X remain in the process structure tree (PST) in the same place, and such locality of change is not only applied to all canonical fragments above the parent but also applied to all canonical fragments below the siblings of the changed canonical fragment X.

It is desirable that the block-based process model has as many structures as possible and each structure as fine as possible. Finer blocks enable mapping of more BPMN diagrams to BPEL processes in a structured way. Also, a BPEL process is more readable if it contains more blocks. Furthermore, debugging is easier when an error is local to a small block than to a large one.

The hierarchical decomposition method 20 of the present invention parses the two-terminal graph (TTG) 12 into the process structure tree (PST) 14 that has unique, modular, and finer blocks than conventional parsing methods. The hierarchical decomposition method 20 of the present invention is deterministic, i.e., generates unique canonical fragments. Thus, identical two-terminal graphs (TTGs) are parsed into the same process structure tree (PST) after being decomposed.

The hierarchical decomposition method 20 of the present invention can be employed in areas of improving process model visualization for process model analysis and error detection, comparing process model versions and detecting differences among them, merging multiple versions of process model into an integrated process model, etc.

Figure 2:
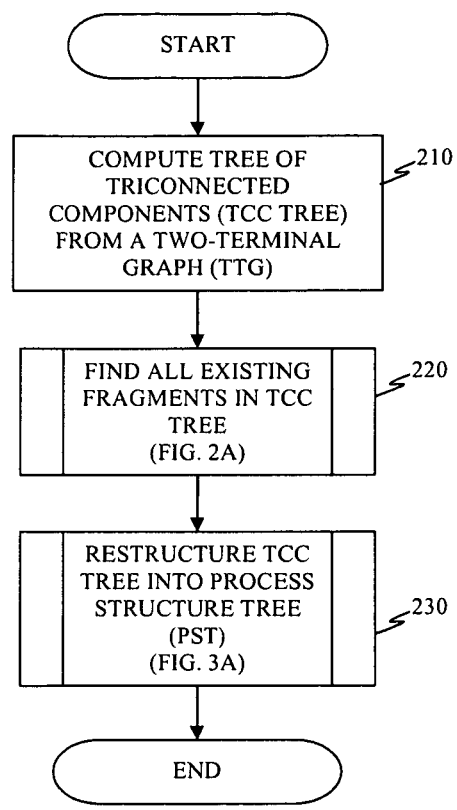
FIG. 2 is a flowchart illustrating a method for hierarchically decomposing a graph-based process model into a block-based process model, in accordance with the embodiments of the present invention.

FIG. 2 is a flowchart illustrating a method for hierarchically decomposing a graph-based process model into a block-based process model, in accordance with the embodiments of the present invention.

A two-terminal graph (hereinafter TTG) that represents the graph-based process model is provided for the method. A data structure describing the TTG is stored in a storage medium and/or provided interactively by a user.

In step 210, the method computes a tree of triconnected components (hereinafter TCC tree) of the TTG. The method utilizes a conventional method of computing a TCC tree from a TTG.

A graph without self-loops is "k-connected," wherein k is a positive integer, if it has at least (k+1) nodes and for every set W of (k−1) nodes, any two nodes u; v∉W are connected without W. In this specification, the term "biconnected" is used interchangeably with "2-connected", and the term "triconnected" is used interchangeably with "3-connected".

A "separation point" of a graph G is a node u wherein there are two nodes in G that are not connected without {u}. A "separation pair" of a graph G is a pair of nodes {u, v} wherein there are two nodes in G that are not connected without {u, v}.

For a pair of nodes {u, v}, a "separation class" with respect to {u, v} is a maximal set S of edges such that any pair of edges in S is connected without {u, v}. S is a "proper separation class" or a "branch" if S does not contain a "return edge" that connects the entry and the exit of G. {u, v} is called a "boundary pair" if there are at least two separation classes with respect to {u, v}. {u, v} is a boundary pair if and only if {u, v} is a separation pair or u and v are adjacent in G. Each node in the pair {u, v} is a "boundary node".

Each weakly biconnected graph can be uniquely decomposed into a set of graphs, called "triconnected components" of the weakly biconnected graph. Because the TTG is weakly biconnected, the TTG can be uniquely decomposed into triconnected components of the TTG. A triconnected component of the TTG is a bond, a polygon, or a triconnected graph. A bond is a graph that contains exactly two nodes and at least two edges between them. A polygon is a graph that contains at least three nodes, exactly as many edges as nodes such that there is a cycle that contains all its nodes and all its edges. A triconnected graph is, as defined above, a graph that contains at least four (4) nodes and for every set of two (2) nodes, any other two nodes outside of the set are still connected.

Triconnected components are closely related to boundary pairs. A set {u, v} of two nodes is a boundary pair of U(G) if and only if:
1. nodes u and v are adjacent in U(G),
2. a triconnected component of U(G) contains a virtual edge between u and v, or
3. a triconnected component of U(G) is a polygon and contains u and v.

Boundary pairs are closely related to fragments as below:
1. If F∈ℱ(u, v), then {u, v} is a boundary pair of U(G) and F is the union of one or more proper separation classes with respect to {u, v}.
2. Let {u, v} be a boundary pair of U(G) and F the union of one or more proper separation classes with respect to {u, v}. If u is an entry of F and v is an exit of F, then F ∈ ℱ(u, v).

In step 220, the method finds all existing fragments in the TCC tree. See FIG. 2A, infra, for details.

In step 230, the method restructures the TCC tree into a process structure tree (hereinafter PST). The PST of a TTG G can be computed in time linear to the number of edges of G. See FIG. 3A, infra, for an embodiment of step 230.

Figure 2A:
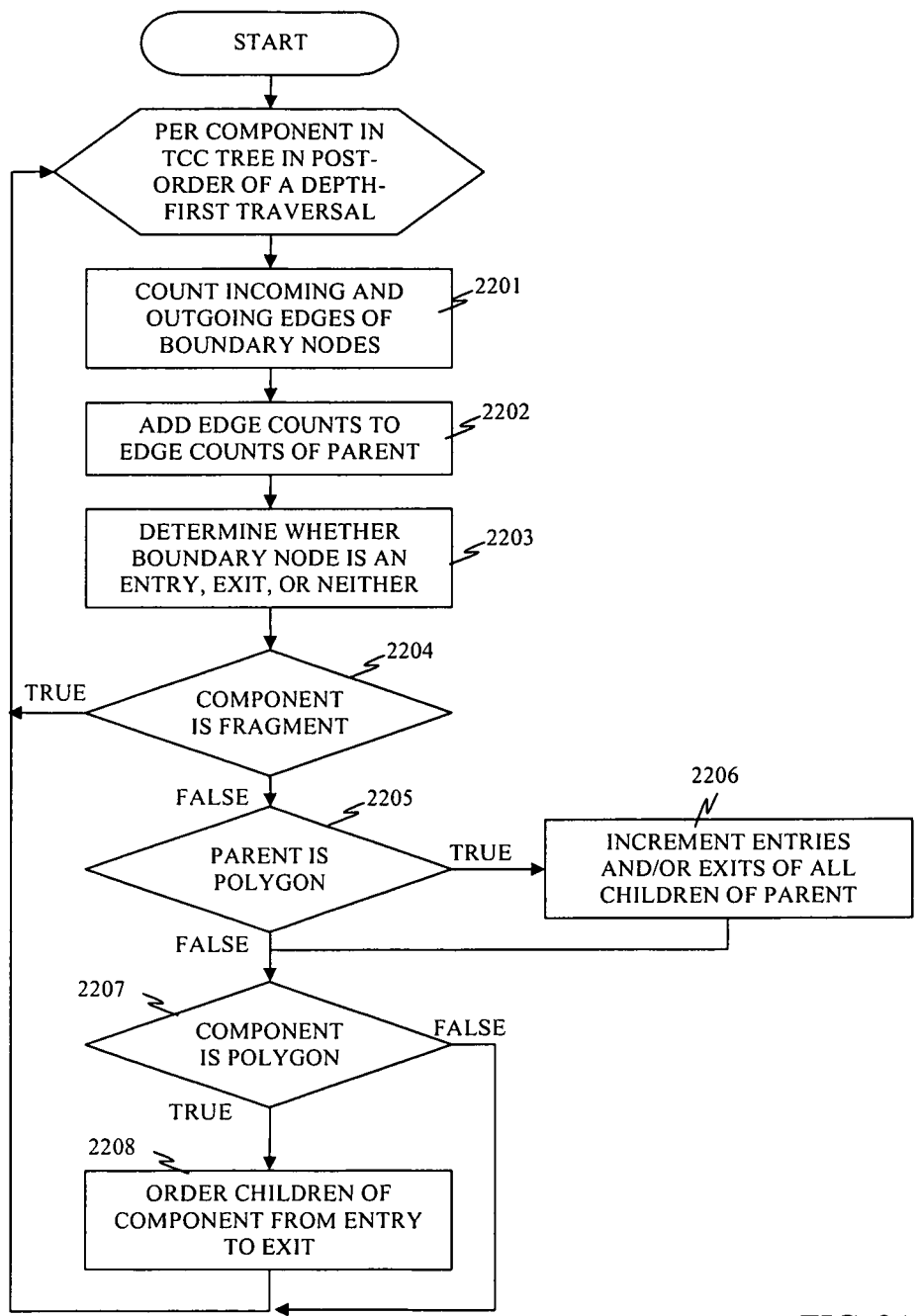
FIG. 2A illustrates details of step 220 of FIG. 2, wherein the method finds all existing fragments in the tree of triconnected components (TCC tree) from step 210, in accordance with the embodiments of the present invention.

FIG. 2A illustrates details of step 220 of FIG. 2, supra, wherein the method finds all existing fragments in the tree of triconnected components (TCC tree) from step 210, in accordance with the embodiments of the present invention.

To find all existing fragments, the method analyzes each triconnected component of the TCC tree. The method examines the directions of edges incident to a boundary node of each triconnected component. A triconnected component is a fragment if one boundary node is an entry, and the other an exit of the triconnected component. A triconnected component is referred to as a component in short. As previously defined, a boundary node is an entry of a component if no incoming edge to the boundary node is outside the component or all outgoing edges are in the component.

Prior to step 2201, the method initializes an incoming edge count and an outgoing edge count of boundary nodes of a component to zero (0).

See FIG. 3. infra, for a data structure for the component. In one embodiment of the present invention, the data structure of the component is initialized as shown in Table 1 prior to performing step 2201:

TABLE 1

```
c.b0Incoming = 0, c.b1Incoming = 0,
c.b0Outgoing = 0, c.b1Outgoing = 0,
c.entry = null, c.exit = null, c.isFragment = false,
c.entriesOfChildren = 0, c.exitsOfChildren = 0,
c.firstEntryOfChild = null, c.lastExitOfChild = null,
c.latestChildWithEntry = null,
c.descendantsToMerge = new linkedList,
c.siblingsToMerge = new list
```

As defined in descriptions of FIG. 1, supra, a fragment F is a connected subgraph of the tree of triconnected components (TCC tree) wherein F has exactly two boundary nodes, an entry and an exit. The method performs steps 2201, 2202, 2203, 2204, 2205, 2206, 2207, and 2208 for all components in the TCC tree in post-order depth-first traversal. Thus, the method performs steps in FIG. 2A for a component in the TCC tree after all children of the component are processed with steps in FIG. 2A. Because a node can be a boundary node of multiple triconnected components, the method utilizes post-order depth-first traversal in processing each node to ensure linear calculation time by reducing multiple redundant processing of a same node. By processing each node bottom-up with post-order depth-first traversal, the method processes each edge no more than twice, once per each boundary node of a parent of the node, and a fragment updates an edge counter of the parent of the node no more than four times, an incoming edge count and an outgoing edge count for each boundary node.

In one embodiment of the present invention, the post-order depth first traversal is achieved by recursively invoking a procedure that implements steps in FIG. 2A for all children of the component prior to perform steps in FIG. 2A for the component.

In step 2201, the method calculates an incoming edge count and an outgoing edge count of a first boundary node of a component. The method also calculates an incoming edge count and an outgoing edge count of a second boundary node of the component.

In one embodiment of the present invention, step 2201 is as shown in Table 2:

TABLE 2

```
for each edge e in c.children do
  if e.source == c.b0 then
    c.b0Outgoing++
  else if e.source = c.b1 then
    c.b1Outgoing++
  if e.target = c.b0 then
    c.b0Incoming++
  else if e.target = c.b1 then
    c.b1Incoming++
```

In this embodiment, the method counts edges separately for each boundary node b0 and b1. If the component does not include any subcomponents, these children edges are the only edges inside the component. If the component has a child component, which shares a boundary node with the component, then the edges inside the child are also inside the component.

In step 2202, the method adds the incoming edge count of the first boundary node of the component to an incoming edge count of a first boundary node of a parent of the component, if the first boundary node of the component is the first boundary node of the parent of the component. In step 2202, the method also adds the outgoing edge count of the second boundary node of the component to an outgoing edge count of a second boundary node of the parent of the component, if the second boundary node of the component is the second boundary node of the parent of the component.

In one embodiment of the present invention, a procedure implementing step 2202 is as shown in Table 3:

TABLE 3

```
addEdgeCountsToEdgeCountsOfParent(component c)
p = c.parent
if p ≠ null then
  if p.b0 == c.b0 then
    p.b0Outgoing = p.b0Outgoing + c.b0Outgoing
    p.b0Incoming = p.b0Incoming + c.b0Incoming
  else if p.b0 == c.b1 then
    p.b0Outgoing = p.b0Outgoing + c.b1Outgoing
    p.b0Incoming = p.b0Incoming + c.b1Incoming
  if p:b1 == c.b0 then
    p.b1Outgoing = p.b1Outgoing + c.b0Outgoing
    p.b1Incoming = p.b1Incoming + c.b0Incoming
  else if p.b1 = c.b1 then
    p.b1Outgoing = p.b1Outgoing + c.b1Outgoing
    p.b1Incoming = p.b1Incoming + c.b1Incoming
```

In step 2203, the method determines whether each boundary node of the component is either an entry of the component or an exit of the component.

In one embodiment of the present invention, the method determines the entry and the exit of the component by comparing the incoming edge count and the outgoing edge count of the component as shown in Table 4:

TABLE 4

```
if c.b0Incoming == 0 or c.b0.outgoing.size( ) == c.b0Outgoing
  then
  c.entry = c.b0
else if c.b1Incoming == 0 or c.b1.outgoing.size( ) == c.b1Outgoing
  then
  c.entry = c.b1
if c.b0Outgoing == 0 or c.b0.incoming.size( )== c.b0Incoming
  then
  c.exit = c.b0
else if c.b1Outgoing == 0 or c.b1.incoming.size( )== c.b1Incoming
  then
  c.exit = c.b1
```

In this embodiment, the method determines whether the boundary node is an entry, an exit, or neither, by checking whether all incoming edges are inside or outside of the node and by checking whether all outgoing edges are inside or outside of the node.

In step 2204, the method determines whether the component is a fragment. The component is a fragment if the entry and the exit of the components have non-null values, which have been assigned in step 2203. If the method determines that the component is a fragment, the method loops back to step 2201 for a next component. If the method determines that the component is not a fragment, the method proceeds with step 2205.

In step 2205, the method determines whether the parent of the component is a polygon. If the parent of the component is a polygon, the method proceeds with step 2206. If the parent of the component is not a polygon, the method proceeds with step 2207.

In step 2206, because the parent of the component is a polygon, the method counts entries and/or exits of all children of the parent.

In one embodiment of the present invention, step 2206 is as Table 5:

TABLE 5

```
if c.parent ≠ null and c.parent.type == polygon then
    if c.entry ≠ null then
        c.parent.entriesOfChildren++
    if c.exit ≠ null then
        c.parent.exitsOfChildren++
```

In step 2207, the method determines whether the component is a polygon. If the method determines that the component is a polygon, the method proceeds with step 2208. If the method determines that the component is not a polygon, the method loops back to step 2201 for a next component.

In step 2208, the method order children of the component that is a polygon. The children of the component are ordered from the entry of the component to the exit of the component, or from an entry of a selected child of the component to an exit of the selected child of the component, if the selected child has the entry or the exit. The resulting order is unique because any two children of a polygon cannot have edges in opposite directions since every node in a two-terminal graph (TTG) is on a directed path from a sink to a source.

In one embodiment of the present invention, a procedure implementing step 2208 is as Table 6:

TABLE 6

```
if c.entry == c.b0 or c.exit == c.b1 then
    orderChildren(c.b0, c.b1, c)
else if c.entry == c.b1 or c.exit == c.b0 then
    orderChildren(c.b1, c.b0, c)
else
    for each component d in c.children do
        if c.exit ≠ null then
            orderChildren(c.b0, c.b1, c)
            break
        else if c.entry ≠ null then
            orderChildren(c.b1, c.b0, c)
            break
```

In this embodiment, the method orders children of the component from b0 to b1, or vice versa, among two boundary nodes. If either b0 or b1 is an entry or an exit, the nodes are ordered from the entry. Otherwise, the order can be decided based the remaining nodes in the polygon. These nodes are boundary nodes of the child components.

The procedure orderChildren(node entry, node exit, component c) orders component c from node entry to node exit. The method computes the order in linear time, because the order is directly derived from the structure of the polygon by traversing it either clockwise or counter clockwise. Because the boundary nodes are adjacent in a polygon, the traversal is started from the entry using a depth-first traversal that picks first an edge incident to the entry that is not incident to the exit.

FIG. 3 illustrates an embodiment of component data structure employed in example procedures of FIGS. 3A, 3B, 3C-1, 3C-2, 3D, and 3E, infra, in accordance with the embodiments of the present invention.

Line A01 component c indicates the name of the data structure that defines component type. Lines A02 to A22 are attributes of component c.

Line A02 parent indicates a parent of component c that is also a component type.

Line A03 children indicates children of component c that are represented as a list of components, wherein each child is also a component type.

Line A04 edges indicates edges of component c that are represented as a list of edges, wherein each edge in component c is represented by two nodes {source, sink}.

Line A05 type indicates classification of component c that is one of enumerated values {bond, polygon, triconnected, trivial, non-tcc}. The value of type of a triconnected component component c is a bond, a polygon or a triconnected graph. The trivial value of type of a subgraph is a trivial fragment wherein the trivial fragment is a fragment that contains exactly one edge. The default value of the attribute type of a subgraph is non-tcc.

Line A06 isFragment indicates whether component c is a fragment. If component c is a fragment, isFragment has a Boolean value true (1). If component c is not a fragment, isFragment has a Boolean value false (0) that is a default value for the attribute isFragment.

Line A07 isMerged indicates whether component c is to be merged with another component. If component c is to be merged with another component, isMerged has a Boolean value true (1). If component c needs not be merged, isMerged has a Boolean value false (0) that is a default value for the attribute isMerged.

Line A08 entry indicates an entry node of component c. The attribute entry has a null value as a default. If there is no entry node is discovered in component c, entry value is not changed.

Line A09 exit indicates an exit node of component c. The attribute exit has a null value as a default. If there is no exit node is discovered in component c, exit value is not changed.

Line A10 indicates a first boundary node b0 of component c.

Line A11 indicates a second boundary node b1 of component c.

Line A12 b0Incoming indicates the number of edges that are coming into the first boundary node b0 of component c, and inside component c.

Line A13 b0Outgoing indicates the number of edges that are going out from the first boundary node b0 of component c, and inside component c.

Line A14 b1Incoming indicates the number of edges that are coming into the second boundary node b1 of component c, and inside component c.

Line A15 b1Outgoing indicates the number of edges that are going out from the second boundary node b1 of component c, and inside component c.

Line A16 entriesOfChildren indicates the number of entries of children of component c that is a polygon.

Line A17 exitsOfChildren indicates the number of exits of children of component c that is a polygon.

Line A18 firstEntryOfChild indicates the first node that is an entry of a child of component c.

Line A19 lastEntryOfChild indicates the last node that is an entry of a child of component c.

Line A20 latestChildWithEntry indicates the latest child of component c that has an entry.

Line A21 descendantsToMerge indicates a linked list of components that are descendants of component c and are to be merged with component c.

Line A22 siblingsToMerge indicates a list of components that are siblings of component c and are to be merged with component c.

Line A23 maxSubSequence indicates a component that is a maximal sequence such that it is a union of child components of a polygon c that is not a maximal sequence.

FIG. 3A illustrates an embodiment of a procedure restructure( ) restructuring a subgraph component into a process structure tree (PST) in step 230 of FIG. 2, supra, in accordance with the embodiments of the present invention.

Line 301 is a name of the procedure restructure(component c) that is invoked to perform step 230 of FIG. 2, supra, restructuring a subgraph component c into a process structure tree (PST).

In lines 302 to 305, the method creates a component for the substructure of a polygon, if component c is a polygon and is not a fragment but component c has at least two fragments as children.

In lines 306 to 307, the method restructures the component tree in a post-order by recursively invoking the procedure restructure( ) for each child of component c.

In lines 308 to 311, the method restructures component c according to the type of component c. See FIG. 3B, infra, for an embodiment of a procedure restructuring component c if component c is a polygon. See FIGS. 3C-1 and 3C-2, infra, for an embodiment of a procedure restructuring component c if component c is a bond.

In line 312, the method collects descendant fragments of component c that have no parent fragment. See FIG. 3F, infra, for an embodiment of a procedure collecting descendant fragments having no parent.

In lines 313 and 314, the method analyzes component c whether component c should be merged with siblings of component c, if the parent of component c is a polygon. See FIG. 3G, infra, for an embodiment of a procedure analyzing component c having a polygon parent.

FIG. 3B illustrates an embodiment of a procedure restructurePolygon( ) restructuring a polygon that is invoked at line 309 of restructure( ) of FIG. 3A, supra, in accordance with the embodiments of the present invention.

The procedure restructurePolygon(component c) restructures component c that is a polygon, when it is invoked by restructure( ) of FIG. 3A, supra, at line 309. Instead of deleting merged children from the list of children of the polygon component c, the method creates a new list of children, where the procedure restructurePolygon( ) adds only the children of the polygon that are fragments. Instead of adding also the other children of the polygon that are not fragments, the procedure restructurePolygon( ) adds to the new children list those descendant fragments of each child that forms a respective child of a polygon. If the children were simply deleted from the array list of children, the method would not have linear time complexity. If the polygon, i.e., component c, is a fragment, then each child of component c that is not merged to another child is added as a child of component c. If the polygon, i.e., component c, is not a fragment, then each child of component c that is not merged to another child is added as a child to a maximal sequence.

FIGS. 3C-1 and 3C-2 illustrate an embodiment of a procedure restructureBond( ) restructuring a bond that is invoked at line 311 of restructure( ) of FIG. 3A, supra, in accordance with the embodiments of the present invention.

The procedure restructureBond(component c) categorizes branches of component c that is a bond and creates a new component for each subtype of a maximal bond fragment. If the bond, i.e., component c, is a maximal fragment, the bond may contain a maximal directed bond fragment, a maximal semi-pure bond fragment, and a maximal pure bond fragment. If the bond, i.e., component c, is not a fragment, the bond may contain two maximal pure bond fragments, and one maximal semi-pure bond fragment.

FIG. 3D illustrates an embodiment of a procedure restructureBondFragment( ) restructuring a fragment bond that is invoked from restructureBond( ) of FIGS. 3C-1 and 3C-2, supra, in accordance with the embodiments of the present invention.

The procedure restructureBondFragment(component c, component pure, component reversePure, component semiPure, component undirected) restructures a bond component c that is also a maximal bond fragment B. Each branch of the bond component c is a child component of the bond component c. If at least two directed branches have a common entry and a common exit with B, then all of said at least two directed branches are children of a maximal pure bond fragment R.

A maximal semi-pure bond S exists if either (i) there are at least two branches that contain no incoming edges of the entry of B, at least one of these branches is not a directed branch, and there are no undirected branches that contain both incoming and outgoing edges of the entry of B, or (ii) there are at least two branches that contain no outgoing edges of the exit of B, at least one of said two branches is not a directed branch, and there are no undirected branches that contain both incoming and outgoing edges of the exit of B. The subfragments of these undirected branches are subfragments of S. If both R and S exist, then R is a child of S. If S contains only one directed branch, then the branch is a child of S.

If there are undirected branches not included in the maximal semi-pure bond fragment S, then the subfragments of the undirected branches are subfragments of the maximal directed bond fragment D. If there is only one undirected branch and no undirected branches from the entry of B to the exit of B, then the undirected branch is a fragment.

The maximal bond fragment B has all directed branches from the exit of B to the entry of B as children of B. If there is no such a directed branch, the maximal bond fragment B is the same as the maximal directed bond fragment. In addition to directed branches, B always contains a fragment that has all the undirected branches and the directed branches from the entry of B to the exit of B as children of B.

FIG. 3E illustrates an embodiment of a procedure restructureBondNonFragment( ) restructuring a non-fragment bond that is invoked from restructureBond( ) of FIGS. 3C-1 and 3C-2, supra, in accordance with the embodiments of the present invention.

The procedure restructureBondNonFragment(component c, component pure, component reversePure, component semiPure, component undirected) restructures a bond that is not a fragment. If there are at least two directed fragments from the entry of B to the exit of B, all the directed branches are children of a maximal pure bond fragment R1. If there are at least two directed fragments from the exit of B to the entry of B, all the directed branches are children of a maximal pure bond fragment R2.

A maximal semi-pure bond S exists if either (i) there are at least two branches that contain no incoming edges of the entry of B, at least one of the at least two branches is not a directed branch, and there are no undirected branches that contain both incoming and outgoing edges of the entry of B, or (ii) there are at least two branches that contain no outgoing edges of the exit of B, at least one of the at least two branches is not a directed branch, and there are no undirected branches that contain both incoming and outgoing edges of the exit of B. The subfragments of all the remaining branches are merged to the smallest fragment that contains B.

Figure 4A:
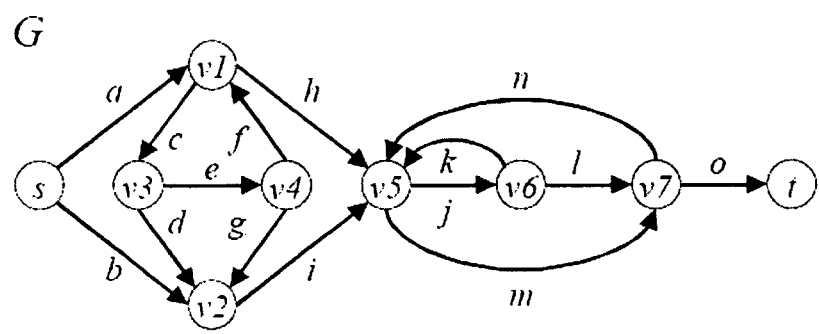
FIG. 4A illustrates an example of a two-terminal graph (TTG) input to step 210 of FIG. 2, in accordance with the embodiments of the present invention.

FIG. 4A illustrates an example of a two-terminal graph (TTG) input to step 210 of FIG. 2, supra, in accordance with the embodiments of the present invention.

The TTG G is a directed graph that has no self-loops such that there is a source node s and a sink node t, wherein t≠s, and each node v is on a directed path from s to t. Edges are represented as E={a, b, c, d, e, f g, h, i, j, k, l, m, n, o}.

Figure 4B:
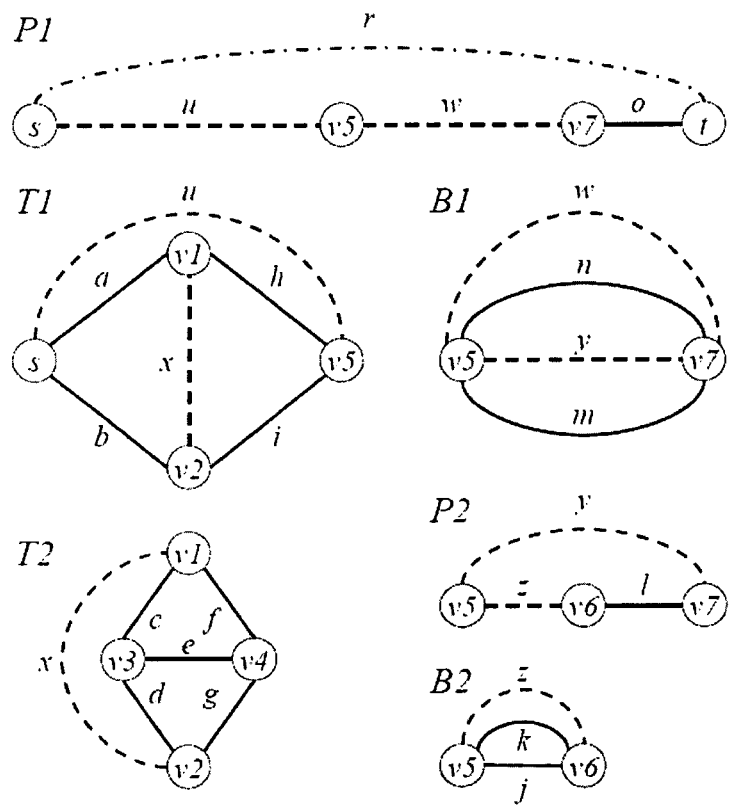
FIG. 4B illustrates triconnected components in the two-terminal graph (TTG) of FIG. 4A, in accordance with the embodiments of the present invention.

FIG. 4B illustrates triconnected components in the two-terminal graph (TTG) of FIG. 4A, supra, in accordance with the embodiments of the present invention.

To acquire triconnected components of the TTG G of FIG. 4A, supra, the method first computes an undirected version of G, referred to as U(G), that is an undirected graph that results from removing directions of all edges of G and adding an return edge {r} connecting the source s and the sink t.

There are six triconnected components, P1, P2, B1, B2, T1, and T2, of graph U(G). P1 and P2 are polygons, B1 and B2 are bonds and T1 and T2 are triconnected graphs.

"Virtual edges" shown as dashed lines, {u, w, x, y, z}, are added to each component to provide information on how the components are related to other components. Each virtual edge occurs in exactly two components, whereas each original edge occurs in exactly one component. For example, the virtual edge x occurs in the components T1 and T2. In component T1, x represents the component T2, whereas x represents T1 in T2. Therefore, by merging the triconnected components at the virtual edges and removing the virtual edges, the method computes the original TTG G.

Figure 4C:
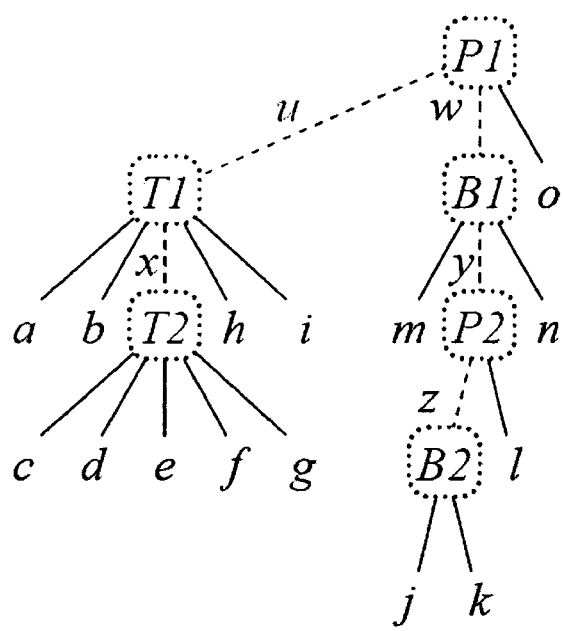
FIG. 4C illustrates an example tree of triconnected components (TCC tree) resulting from step 210 of FIG. 2 after processing the two-terminal graph (TTG) of FIG. 4A, in accordance with the embodiments of the present invention.

FIG. 4C illustrates an example tree of triconnected components (TCC tree) resulting from step 210 of FIG. 2, supra, after processing the two-terminal graph (TTG) of FIG. 4A, supra, in accordance with the embodiments of the present invention.

The triconnected components of FIG. 4B, supra, is arranged in a tree, referred to as a triconnected component tree (TCC tree), where two components are connected if they share a virtual edge. The root of the TCC tree is the unique component that contains the return edge {r}. Original edges are shown in the TCC tree under the unique component that contains a respective original edge. Therefore, each component C determines a set F of edges of the original graph G, namely all leaf nodes of the subtree to which C corresponds. For example, component T1 determines the set F={a, b, c, d, e, f, g, h, i} of edges.

Figure 4D:
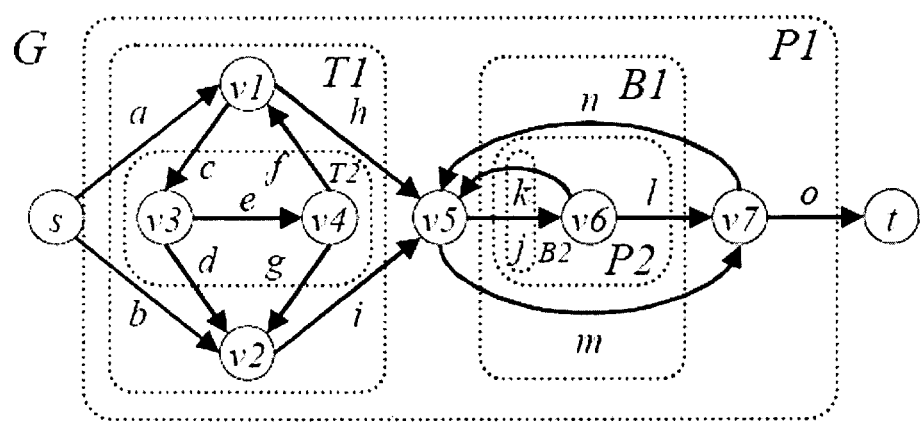
FIG. 4D illustrates an example component subgraph resulting from step 220 of FIG. 2 on the two-terminal graph (TTG) of FIG. 4A, in accordance with the embodiments of the present invention.

FIG. 4D illustrates an example component subgraph resulting from step 220 of FIG. 2, supra, on the two-terminal graph (TTG) of FIG. 4A, supra, in accordance with the embodiments of the present invention.

The term "component subgraph" of C refers to the subgraph formed by the set F of edges from the original graph G defined by each triconnected component C of FIG. 4C, supra. Component subgraphs B1, P1 and T1 are fragments, whereas B2, P2 and T2 are not fragments. There are also fragments that are not component subgraphs, as shown in F'={j, k, l, m}.

For instance, the boundary pair {v5, v7} has three proper separation classes {m}, P2={j, k, l}, and {n}. P2 is not a fragment, because v5 is neither its entry nor its exit, whereas {m}∈$\mathcal{F}$(v5, v7) and {n}∈$\mathcal{F}$(v7, v5) are fragments. The union of P2 and {m} is a fragment, whereas P2∪{n} and {m}∪{n} are not fragments. P2∪{m}∪{n} is a fragment. All boundary pairs are obtained from the triconnected components, and fragments are obtained from the boundary pairs.

Figure 4E:
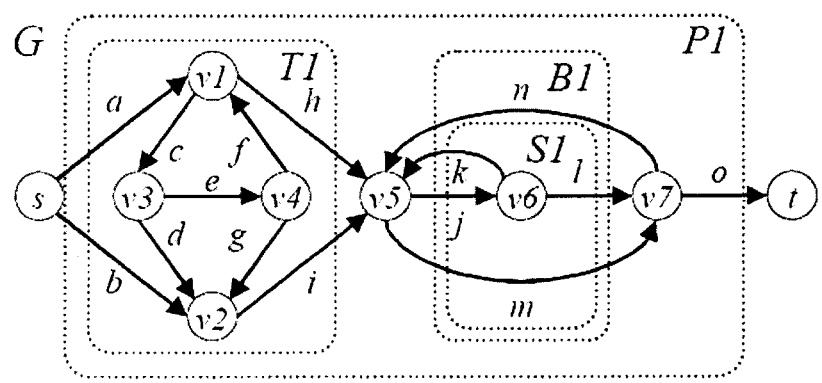
FIG. 4E illustrates an example of canonical fragments resulting from step 230 of FIG. 2 after processing the component subgraphs (TCC tree) of FIG. 4D, in accordance with the embodiments of the present invention.

FIG. 4E illustrates an example of canonical fragments resulting from step 230 of FIG. 2, supra, after processing the component subgraphs (TCC tree) of FIG. 4D, supra, in accordance with the embodiments of the present invention.

As defined, canonical fragments are a subset of fragments that do not overlap, i.e., either nested or disjoint, with each other such that fragments are uniquely determined for an original two-terminal graph. Each edge is a canonical fragment, which we call a trivial fragment.

The non-trivial canonical fragments of graph G, S1, B1, T1, and P1, are generated as a result of performing step 230 of FIG. 2, supra, on component subgraphs of FIG. 4D, supra. S1∈$\mathcal{F}$(v5, v7) is a maximal semi-pure bond fragment, and B1∈$\mathcal{F}$(v5, v7) is a maximal bond fragment. P1 is a maximal sequence. T1 is neither a sequence nor a bond fragment.

Figure 4F:
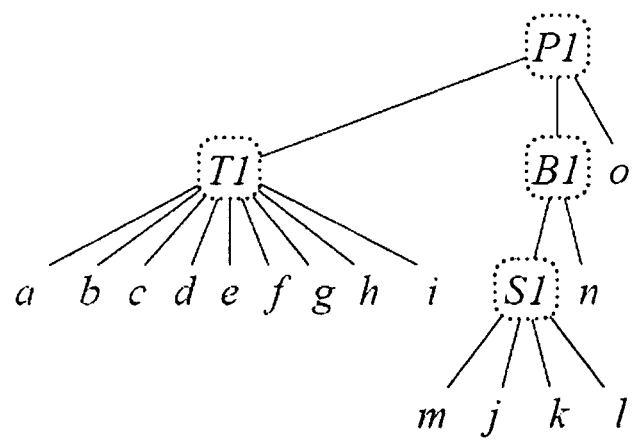
FIG. 4F illustrates an example of a process structure tree (PST) representing the canonical fragments of FIG. 4E, in accordance with the embodiments of the present invention.

FIG. 4F illustrates an example of a process structure tree (PST) representing the canonical fragments of FIG. 4E, supra, in accordance with the embodiments of the present invention.

The PST is a tree of the canonical fragments such that the parent of a fragment is the smallest canonical fragment that contains the fragment. In this embodiment, the fragment S1 is the smallest canonical fragment that contains fragments m, j, k, and l. Leaf nodes of the PST, which are, a, b, c, d, e, f, g, h, i, m, j, k, l, n, and o, are trivial fragments. The canonical fragments that contain more than one edge, which are P1, T1, B1, and S1, are the non-leaf nodes of the PST.

Figure 5:
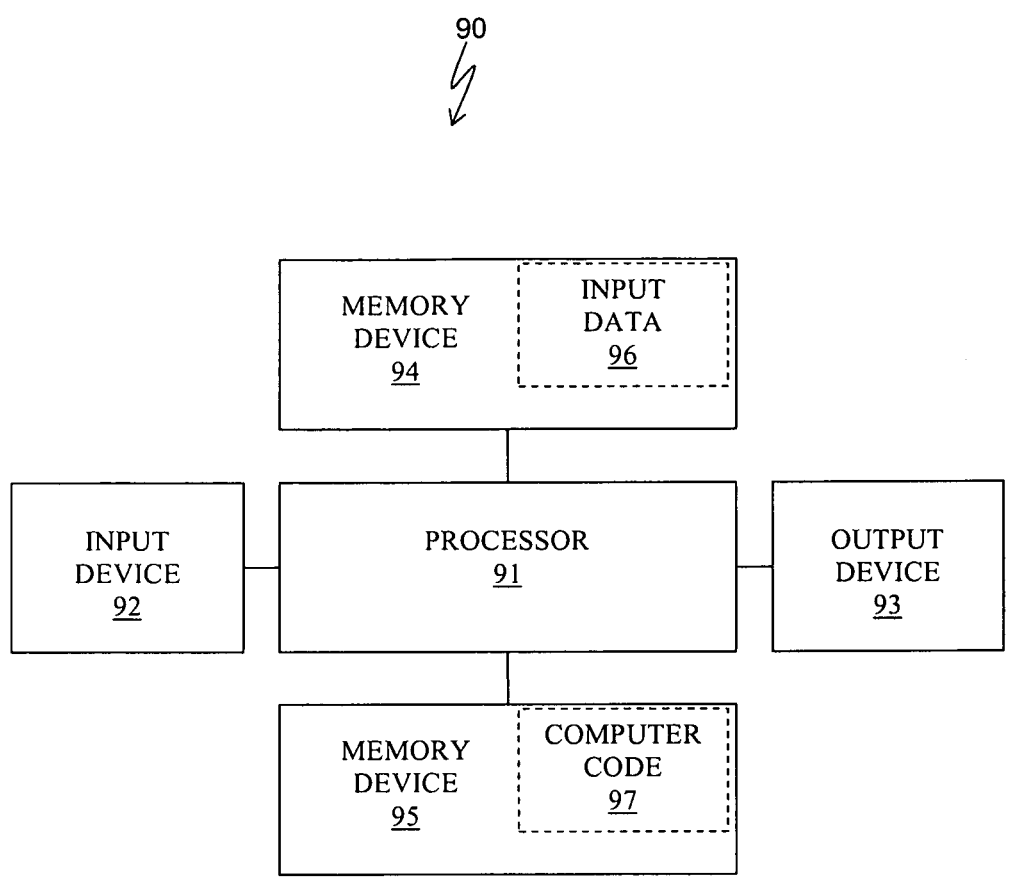
FIG. 5 illustrates a computer system used for hierarchically decomposing a graph-based process model into a block-based process model, in accordance with embodiments of the present invention.

FIG. 5 illustrates a computer system used for hierarchically decomposing a graph-based process model into a block-based process model, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VoIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for hierarchically decomposing a graph-based process model into a block-based process model according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for hierarchically decomposing a two-terminal graph G into a process structure tree PST, the method comprising:
    parsing G into a tree T comprising triconnected components;
    finding all existing fragments from the triconnected components in T;
    restructuring T such that PST consists of restructured T, and
    transmitting PST to an output device of a computer system,
    wherein G is defined as a two-terminal graph that is a directed graph without self-loops such that there is at most one source node s of G, and at most one sink node t of G, wherein t≠s and each node of G is on a directed path from s to t,
    wherein a triconnected component of said triconnected components is a bond, a polygon, or a 3-connected graph, and each triconnected component determines a respective boundary pair comprising two boundary nodes,
    wherein the respective boundary pair determines a respective fragment F of G, wherein F is a connected subgraph of G that has said two boundary nodes as an entry of F and an exit of F,
    wherein PST is a tree of canonical fragments of G such that a parent P of a canonical fragment of said canonical fragments is the smallest canonical fragment of G that properly contains the canonical fragment, and
    wherein the canonical fragment is a fragment of a program that does not overlap with any other fragment of the program, and wherein the program is executable by a microprocessor.

2. The method of claim 1, said finding comprising:
    selecting, in an order according to a post-order traversal of T, a triconnected component TCC of said triconnected components in T that is not previously selected by said selecting;
    computing an outgoing edge count and an incoming edge count for each boundary node of two boundary nodes of TCC;
    updating an incoming edge count and an outgoing edge count for each boundary node of two boundary nodes of a parent of TCC with a result from said computing; and
    determining that a first boundary node of said two boundary nodes of TCC is an entry of TCC and that a second boundary node of said two boundary nodes of TCC is an exit of TCC and consequently determining that TCC is a fragment.

3. The method of claim 1, said finding comprising:
    selecting, in an order according to a post-order traversal of T, a triconnected component TCC of said triconnected components in T that is not previously selected by said selecting;
    computing an outgoing edge count and an incoming edge count for each boundary node of two boundary nodes of TCC;
    updating an incoming edge count and an outgoing edge count for each boundary node of two boundary nodes of a parent of TCC with a result from said computing;
    determining that TCC does not comprise either an entry or an exit, followed by determining that TCC is not a fragment;
    determining that the parent of TCC is a polygon and subsequently counting entries and exits of all children of the parent; and
    determining that TCC is a polygon and subsequently ordering all children of TCC.

4. The method of claim 1, said finding comprising:
    selecting, in an order according to a post-order traversal of T, a triconnected component TCC of said triconnected components in T that is not previously selected by said selecting;
    computing an outgoing edge count and an incoming edge count for each boundary node of two boundary nodes of TCC;
    updating an incoming edge count and an outgoing edge count for each boundary node of two boundary nodes of a parent of TCC with a result from said computing;
    determining that TCC does not comprise either an entry or an exit, followed by determining that TCC is not a fragment;
    determining that the parent of TCC is not a polygon and subsequently determining that TCC is a polygon; and
    ordering all children of TCC that is determined to be a polygon.

5. The method of claim 1, said finding comprising:
    selecting, in an order according to a post-order traversal of T, a triconnected component TCC of said triconnected components in T that is not previously selected by said selecting;
    computing an outgoing edge count and an incoming edge count for each boundary node of two boundary nodes of TCC;
    updating an incoming edge count and an outgoing edge count for each boundary node of two boundary nodes of a parent of TCC with a result from said computing;
    determining that TCC does not comprise either an entry or an exit, followed by determining that TCC is not a fragment; and
    determining that the parent of TCC is not a polygon and subsequently determining that TCC is not a polygon.

6. The method of claim 1, said restructuring comprising:
    creating a list of children of a component C upon which said restructuring is performed;
    confirming that the children of C in the list are already restructured by said restructuring;
    determining that C is a polygon and that C is a fragment;
    adding a child of C for each child of C that is not merged to another child of C.

7. The method of claim 1, said restructuring comprising:
    creating a list of children of a component C upon which said restructuring is performed;
    confirming that the children of C in the list are already restructured by said restructuring;
    determining that C is a polygon and that C is not a fragment;
    adding a maximal sequence of C for each child of C that is not merged to another child of C.

8. The method of claim 1, said restructuring comprising:
    creating a list of children of a component C upon which said restructuring is performed;
    confirming that the children of C in the list are already restructured by said restructuring;
    determining that C is a bond and that C is a maximal fragment;

categorizing branches of C by a direction of the branches, wherein C comprises a maximal directed bond fragment, a maximal undirected bond fragment, a maximal semi-pure bond fragment, and/or a maximal pure bond fragment;

discovering the maximal semi-pure bond fragment; and creating a substructure of C by adding reverse pure branches as children of C, adding a pure bond fragment as a child of a member, adding the maximal semi-pure bond fragment as a child of the maximal undirected bond fragment or C, and adding the maximal undirected bond fragment as a child of C, wherein the member is selected from the group consisting of the discovered maximal semi-pure bond fragment, the maximal directed bond fragment, and C.

9. The method of claim 1, said restructuring comprising:

creating a list of children of a component C upon which said restructuring is performed;

confirming that the children of C in the list are already restructured by said restructuring;

determining that C is a bond and that C is not a fragment, wherein C comprises two maximal pure bond fragments and one maximal semi-pure bond fragment;

categorizing branches of C by a direction of the branches, wherein C comprises a directed bond fragment, a undirected bond fragment, a semi-pure bond fragment, and/or a pure bond fragment;

discovering the semi-pure bond fragment; and creating a substructure of C by adding a pure bond fragment of said two pure bond fragments as a child of the discovered semi-pure bond fragment, adding a reverse pure bond fragment as a child of C, adding the semi-pure bond fragment as a child of C, and adding all descendant fragments of undirected branches of C as children of C.

10. An apparatus comprising a computer program product, said computer program product comprising a computer readable storage medium having a computer readable program code embodied therein, said computer readable program code containing instructions configured to be executed by a processor of a computer system to implement a method for hierarchically decomposing a two-terminal graph G into a process structure tree PST, the method comprising:

parsing G into a tree T comprising triconnected components;

finding all existing fragments from the triconnected components in T;

restructuring T such that PST consists of restructured T, and transmitting PST to an output device of a computer system, wherein G is defined as a two-terminal graph that is a directed graph without self-loops such that there is at most one source node s of G, and at most one sink node t of G, wherein t≠s and each node of G is on a directed path from s to t, wherein a triconnected component of said triconnected components is a bond, a polygon, or a 3-connected graph, and each triconnected component determines a respective boundary pair comprising two boundary nodes, wherein the respective boundary pair determines a respective fragment F of G, wherein F is a connected subgraph of G that has said two boundary nodes as an entry of F and an exit of F, wherein PST is a tree of canonical fragments of G such that a parent P of a canonical fragment of said canonical fragments is the smallest canonical fragment of G that properly contains the canonical fragment, and wherein the canonical fragment is a fragment of a program that does not overlap with any other fragment of the program, and wherein the program is executable by a microprocessor.

11. The apparatus of claim 10, said finding comprising:

selecting, in an order according to a post-order traversal of T, a triconnected component TCC of said triconnected components in T that is not previously selected by said selecting;

computing an outgoing edge count and an incoming edge count for each boundary node of two boundary nodes of TCC;

updating an incoming edge count and an outgoing edge count for each boundary node of two boundary nodes of a parent of TCC with a result from said computing; and determining that a first boundary node of said two boundary nodes of TCC is an entry of TCC and that a second boundary node of said two boundary nodes of TCC is an exit of TCC and consequently determining that TCC is a fragment.

12. The apparatus of claim 10, said finding comprising:

selecting, in an order according to a post-order traversal of T, a triconnected component TCC of said triconnected components in T that is not previously selected by said selecting;

computing an outgoing edge count and an incoming edge count for each boundary node of two boundary nodes of TCC;

updating an incoming edge count and an outgoing edge count for each boundary node of two boundary nodes of a parent of TCC with a result from said computing;

determining that TCC does not comprise either an entry or an exit, followed by determining that TCC is not a fragment;

determining that the parent of TCC is a polygon and subsequently counting entries and exits of all children of the parent; and determining that TCC is a polygon and subsequently ordering all children of TCC.

13. The apparatus of claim 10, said finding comprising:

selecting, in an order according to a post-order traversal of T, a triconnected component TCC of said triconnected components in T that is not previously selected by said selecting;

computing an outgoing edge count and an incoming edge count for each boundary node of two boundary nodes of TCC;

updating an incoming edge count and an outgoing edge count for each boundary node of two boundary nodes of a parent of TCC with a result from said computing;

determining that TCC does not comprise either an entry or an exit, followed by determining that TCC is not a fragment;

determining that the parent of TCC is not a polygon and subsequently determining that TCC is a polygon; and ordering all children of TCC that is determined to be a polygon.

14. The apparatus of claim 10, said finding comprising:

selecting, in an order according to a post-order traversal of T, a triconnected component TCC of said triconnected components in T that is not previously selected by said selecting;

computing an outgoing edge count and an incoming edge count for each boundary node of two boundary nodes of TCC;

updating an incoming edge count and an outgoing edge count for each boundary node of two boundary nodes of a parent of TCC with a result from said computing;

determining that TCC does not comprise either an entry or an exit, followed by determining that TCC is not a fragment; and determining that the parent of TCC is not a polygon and subsequently determining that TCC is not a polygon.

15. The apparatus of claim 10, said restructuring comprising:

creating a list of children of a component C upon which said restructuring is performed;

confirming that the children of C in the list are already restructured by said restructuring;

determining that C is a polygon and that C is a fragment;

adding a child of C for each child of C that is not merged to another child of C.

16. The apparatus of claim 10, said restructuring comprising:

creating a list of children of a component C upon which said restructuring is performed;

confirming that the children of C in the list are already restructured by said restructuring;

determining that C is a polygon and that C is not a fragment;

adding a maximal sequence of C for each child of C that is not merged to another child of C.

17. The apparatus of claim 10, said restructuring comprising:

creating a list of children of a component C upon which said restructuring is performed;

confirming that the children of C in the list are already restructured by said restructuring;

determining that C is a bond and that C is a maximal fragment;

categorizing branches of C by a direction of the branches, wherein C comprises a maximal directed bond fragment, a maximal undirected bond fragment, a maximal semi-pure bond fragment, and/or a maximal pure bond fragment;

discovering the maximal semi-pure bond fragment; and creating a substructure of C by adding reverse pure branches as children of C, adding a pure bond fragment as a child of a member, adding the maximal semi-pure bond fragment as a child of the maximal undirected bond fragment or C, and adding the maximal undirected bond fragment as a child of C, wherein the member is selected from the group consisting of the discovered maximal semi-pure bond fragment, the maximal directed bond fragment, and C.

18. The apparatus of claim 10, said restructuring comprising:

creating a list of children of a component C upon which said restructuring is performed;

confirming that the children of C in the list are already restructured by said restructuring;

determining that C is a bond and that C is not a fragment, wherein C comprises two maximal pure bond fragments and one maximal semi-pure bond fragment;

categorizing branches of C by a direction of the branches, wherein C comprises a directed bond fragment, a undirected bond fragment, a semi-pure bond fragment, and/or a pure bond fragment;

discovering the semi-pure bond fragment; and creating a substructure of C by adding a pure bond fragment of said two pure bond fragments as a child of the discovered semi-pure bond fragment, adding a reverse pure bond fragment as a child of C, adding the semi-pure bond fragment as a child of C, and adding all descendant fragments of undirected branches of C as children of C.

19. The apparatus of claim 10, wherein the apparatus comprises the computer system, and wherein the computer system comprises the computer program product.

\* \* \* \* \*